(12) United States Patent
Wang et al.

(10) Patent No.: US 11,763,489 B2
(45) Date of Patent: Sep. 19, 2023

(54) BODY AND HAND CORRELATION METHOD AND APPARATUS, DEVICE, AND STORAGE MEDIUM

(71) Applicant: SENSETIME INTERNATIONAL PTE. LTD., Singapore (SG)

(72) Inventors: Bairun Wang, Singapore (SG); Xuesen Zhang, Singapore (SG); Chunya Liu, Singapore (SG); Shuai Yi, Singapore (SG)

(73) Assignee: SENSETIME INTERNATIONAL PTE. LTD., Singapore (CN)

( * ) Notice: Subject to any disclaimer, the term of this patent is extended or adjusted under 35 U.S.C. 154(b) by 310 days.

(21) Appl. No.: 17/363,508

(22) Filed: Jun. 30, 2021

(65) Prior Publication Data
US 2022/0405967 A1    Dec. 22, 2022

Related U.S. Application Data

(63) Continuation of application No. PCT/IB2021/055677, filed on Jun. 25, 2021.

(30) Foreign Application Priority Data

Jun. 21, 2021 (SG) .......................... 10202106728X

(51) Int. Cl.
*G06K 9/00* (2022.01)
*G06T 7/77* (2017.01)
(Continued)

(52) U.S. Cl.
CPC ............... *G06T 7/77* (2017.01); *G06F 18/22* (2023.01); *G06T 7/75* (2017.01); *G06V 10/22* (2022.01);
(Continued)

(58) Field of Classification Search
None
See application file for complete search history.

(56) References Cited

U.S. PATENT DOCUMENTS

2021/0174519 A1    6/2021  Bazarevsky et al.
2022/0207741 A1*   6/2022  Wang ................... G06V 40/161

FOREIGN PATENT DOCUMENTS

CN    109508661 A    3/2019
SG    10201913763 W   4/2021

OTHER PUBLICATIONS

"Upper Body Detection and Tracking in Extended Signing Sequences", Jul. 2011, Patrick Buehler and Mark Everingham, International Journal of Computer Vision, vol. 95, pp. 180-197.

(Continued)

*Primary Examiner* — Soo Jin Park
(74) *Attorney, Agent, or Firm* — Cooper Legal Group, LLC

(57) ABSTRACT

Body and hand correlation method, apparatus, device, storage medium and computer program are provided. Method includes: in an image of which an image content includes a body to be correlated and a hand to be correlated, a first correlation probability between a body detection box of the body and a hand detection box of the hand is determined; a second correlation probability between the body and a wrist key point in a key point is determined based on the key point in the body detection box, the key point including the wrist key point and elbow key point belonging to the same arm; a third correlation probability between the hand detection box and the wrist key point is determined based on the wrist key point and elbow key point; and a correlation degree between the body and the hand is determined based on the first, second, and third correlation probabilities.

20 Claims, 3 Drawing Sheets

(51) Int. Cl.
*G06T 7/73* (2017.01)
*G06V 10/22* (2022.01)
*G06V 40/10* (2022.01)
*G06F 18/22* (2023.01)

(52) U.S. Cl.
CPC .. *G06V 40/107* (2022.01); *G06T 2207/30196* (2013.01)

(56) References Cited

OTHER PUBLICATIONS

Written Opinion of the Singaporean application No. 10202106728X, dated Oct. 13, 2021, 8 pgs.
International Search Report in the international application No. PCT/IB2021/055677, dated Oct. 8, 2021, 4 pgs.
Written Opinion of the International Search Authority in the international application No. PCT/IB2021/055677, dated Oct. 8, 2021, 5 pgs.

\* cited by examiner

BODY AND HAND CORRELATION METHOD AND APPARATUS, DEVICE, AND STORAGE MEDIUM

CROSS-REFERENCE TO RELATED APPLICATIONS

This is a continuation application of International Patent Application No. PCT/IB2021/055677, filed on Jun. 25, 2021, which claims priority to Singapore Patent Application No. 10202106728X, filed to the Singapore Patent Office on Jun. 21, 2021 and entitled "BODY AND HAND CORRELATION METHOD AND APPARATUS, DEVICE, AND STORAGE MEDIUM". The contents of International Patent Application No. PCT/IB2021/055677 and Singapore Patent Application No. 10202106728X are hereby incorporated by reference in their entireties.

TECHNICAL FIELD

Embodiments of the application relate to the technical field of image processing, and particularly, but not limited, to a body and hand correlation method and apparatus, a device, and a storage medium.

BACKGROUND

In a complex scene with many people, a person may be occluded by another person, or arms may be staggered. In the related art, a person that a hand belongs to is judged in a manner of combining human key point detection and a sensor, which cannot ensure the judgment accuracy and is relatively high in judgment cost.

SUMMARY

The embodiments of the application provide technical solutions of body and hand correlation.

The technical solutions of the embodiments of the application are implemented as follows.

The embodiments of the disclosure provide a body and hand correlation method, which may include the following operations.

In an image to be detected of which an image content includes a body to be correlated and a hand to be correlated, a first correlation probability between a body detection box of the body to be correlated and a hand detection box of the hand to be correlated is determined.

A second correlation probability between the body to be correlated and a wrist key point in key points is determined based on the key points in the body detection box. The key points in the body detection box includes the wrist key point and an elbow key point belonging to the same arm.

A third correlation probability between the hand detection box and the wrist key point is determined based on the wrist key point and elbow key point belonging to the same arm.

A correlation degree between the body to be correlated and the hand to be correlated is determined based on the first correlation probability, the second correlation probability, and the third correlation probability.

In some embodiments, the operation that the first correlation probability between the body detection box of the body to be correlated and the hand detection box of the hand to be correlated is determined in the image to be detected of which the image content includes the body to be correlated and the hand to be correlated may include the following actions. A body feature in the body detection box and a hand feature in the hand detection box are determined; and the first correlation probability between the body detection box and the hand detection box is determined based on the body feature and the hand feature. As such, position information of the hand to be correlated may be obtained using a detection network, which may not only predict the correlation probability between the hand detection box and the body detection box accurately but also simplify a facility for predicting the correlation probability.

In some embodiments, the operation that the second correlation probability between the body to be correlated and the wrist key point in the key points is determined based on the key point in the body detection box may include the following actions. A confidence that the wrist key point is a truth point is determined; and a correlation probability between the body to be correlated and the wrist key point is determined based on the confidence to obtain the second correlation probability. As such, the key point of the body may be predicted using the body detection box, which may optimize the confidence of the predicted wrist key point, namely optimize the second correlation probability.

In some embodiments, the operation that the correlation probability between the body to be correlated and the wrist key point is determined based on the confidence to obtain the second correlation probability may include the following action. The confidence is determined as the second correlation probability. As such, the confidence that the wrist key point is a truth point may be determined as the correlation probability between the body to be correlated and the wrist key point to represent a correlation between the body to be correlated and the wrist key point more accurately.

In some embodiments, the operation that the third correlation probability between the hand detection box and the wrist key point is determined based on the wrist key point and elbow key point belonging to the same arm may include the following actions. A positional relationship between the wrist key point and the hand detection box is determined based on the wrist key point and elbow key point belonging to the same arm; and the third correlation probability is determined based on the positional relationship and a confidence corresponding to the wrist key point. The confidence corresponding to the wrist key point includes the confidence that the wrist key point is a truth point. As such, by analyzing the reasonability of the positional relationship and combining with the confidence of the wrist key point, it is able to predict the correlation probability between the wrist key point and the hand detection box more accurately.

In some embodiments, the operation that the positional relationship between the wrist key point and the hand detection box is determined based on the wrist key point and elbow key point belonging to the same arm may include the following actions. A first connecting line connecting the wrist key point and elbow key point belonging to the same arm is determined; a second connecting line connecting the wrist key point and a preset point in the hand detection box is determined; and an included angle between the first connecting line and the second connecting line is determined by taking the wrist key point as a vertex along a forearm direction of the arm to obtain the positional relationship. As such, the dependence on the accuracy of the body detection box may be reduced.

In some embodiments, the operation that the third correlation probability is determined based on the positional relationship and the confidence corresponding to the wrist key point may include the following actions. When the included angle is less than a preset angle threshold, a distance from the wrist key point to the preset point in the hand detection box is determined; and the third correlation probability is determined based on the included angle, the distance, and the confidence corresponding to the wrist key point. As such, by combining the reasonability of the included angle and the distance with the confidence corresponding to the wrist key point, it is able to improve the accuracy of the obtained third correlation probability.

In some embodiments, the operation that the third correlation probability is determined based on the included angle, the distance, and the confidence corresponding to the wrist key point may include the following actions. A first confidence of the distance is determined based on a first difference between the distance and a preset length threshold; a second confidence of the included angle is determined based on a second difference between the included angle and the preset included angle threshold; and the first confidence, the second confidence, and the confidence corresponding to the wrist key point are fused to obtain the third correlation probability. As such, the correlation probability between the wrist key point and the hand detection box may be predicted accurately using positions of the elbow key point, the wrist key point, and the hand detection box.

In some embodiments, the operation that the correlation degree between the body to be correlated and the hand to be correlated is determined based on the first correlation probability, the second correlation probability, and the third correlation probability may include the following actions. The first correlation probability is corrected based on the second correlation probability and the third correlation probability to obtain a corrected first probability; and the correlation degree between the body to be correlated and the hand to be correlated is determined based on the corrected first probability. As such, not only may the dependence on the accuracy of the body detection box be reduced, but also the finally determined correlation degree between the body to be correlated and the hand to be correlated may be optimized.

In some embodiments, when the image content of the image to be detected includes multiple bodies to be correlated and multiple hands to be correlated, the operation that the correlation degree between the body to be correlated and the hand to be correlated is determined based on the corrected first probability may include the following actions. A corrected first probability between each body to be correlated and each hand to be correlated is determined to obtain a corrected first probability set; a target corrected first probability with a probability value greater than a preset probability threshold is screened from the corrected first probability set; and the hand to be correlated that is matched with the body to be correlated corresponding to the target corrected first probability is determined based on the target corrected first probability. As such, a corrected first probability with a relatively small probability value may be filtered from the multiple corrected first probabilities using a certain probability threshold to reduce the calculation amount for matching the hands to be correlated and the bodies to be correlated.

In some embodiments, the operation that the second correlation probability between the body to be correlated and the wrist key point in the key points is determined may include that: when the first correlation probability is greater than the preset probability threshold, the second correlation probability between the body to be correlated and the wrist key point in the key points is determined. The operation that the third correlation probability between the hand detection box and the wrist key point is determined may include that: when the second correlation probability is greater than the preset probability threshold, the third correlation probability is determined. The operation that the correlation degree between the body to be correlated and the hand to be correlated is determined based on the first correlation probability, the second correlation probability, and the third correlation probability may include that: when the third correlation probability is greater than the preset probability threshold, the correlation degree between the body to be correlated and the hand to be correlated is determined based on the first correlation probability, the second correlation probability, and the third correlation probability. As such, the correlation probability between the body to be correlated and the wrist key point and the correlation probability between the wrist key point and the hand detection box may be determined progressively to filter relatively low probabilities and further improve the accuracy of matching the body to be correlated and the hand to be correlated.

In some embodiments, before the operation that the correlation degree between the body to be correlated and the hand to be correlated is determined based on the first correlation probability, the second correlation probability, and the third correlation probability, the method may further include the following operations. The first correlation probability, the second correlation probability, and the third correlation probability are fused to obtain a fused probability; and when the fused probability is less than a third preset probability threshold, a position of the wrist key point corresponding to the second correlation probability is updated to obtain an updated wrist key point. As such, the accuracy of the finally updated second correlation probability may be improved.

In some embodiments, body detection, hand detection, and human key point detection may be performed on the image to be detected to determine the body detection box of the body to be correlated, the hand detection box of the hand to be correlated, and the key points of the body to be correlated.

The embodiments of the disclosure provide a body and hand correlation apparatus, which may include a first determination module, a second determination module, a third determination module, and a fourth determination module.

The first determination module is configured to determine, in an image to be detected of which an image content includes a body to be correlated and a hand to be correlated, a first correlation probability between a body detection box of the body to be correlated and a hand detection box of the hand to be correlated.

The second determination module is configured to determine a second correlation probability between the body to be correlated and a wrist key point in key points based on the key points in the body detection box. The key points in the body detection box include the wrist key point and an elbow key point belonging to the same arm.

The third determination module is configured to determine a third correlation probability between the hand detection box and the wrist key point based on the wrist key point and elbow key point belonging to the same arm.

The fourth determination module is configured to determine a correlation degree between the body to be correlated and the hand to be correlated based on the first correlation probability, the second correlation probability, and the third correlation probability.

In some embodiments, the first determination module may include a first determination submodule and a second determination submodule.

The first determination submodule may be configured to determine a body feature in the body detection box and a hand feature in the hand detection box.

The second determination submodule may be configured to determine the first correlation probability between the body detection box and the hand detection box based on the body feature and the hand feature.

In some embodiments, the second determination module may include a third determination submodule and a fourth determination submodule.

The third determination submodule may be configured to determine a confidence that the wrist key point is a truth point.

The fourth determination submodule may be configured to determine a correlation probability between the body to be correlated and the wrist key point based on the confidence to obtain the second correlation probability.

In some embodiments, the second determination module may further be configured to determine the confidence as the second correlation probability.

In some embodiments, the third determination module may include a fifth determination submodule and a sixth determination submodule.

The fifth determination submodule may be configured to determine a positional relationship between the wrist key point and the hand detection box based on the wrist key point and elbow key point belonging to the same arm.

The sixth determination submodule may be configured to determine the third correlation probability based on the positional relationship and a confidence corresponding to the wrist key point. The confidence corresponding to the wrist key point includes the confidence that the wrist key point is a truth point.

In some embodiments, the fifth determination submodule may include a first connecting unit, a second connecting unit, and a first determination unit.

The first connecting unit may be configured to determine a first connecting line connecting the wrist key point and elbow key point belonging to the same arm.

The second connecting unit may be configured to determine a second connecting line connecting the wrist key point and a preset point in the hand detection box.

The first determination unit may be configured to determine an included angle between the first connecting line and the second connecting line by taking the wrist key point as a vertex along a forearm direction of the arm to obtain the positional relationship.

In some embodiments, the sixth determination submodule may include a second determination unit and a third determination unit.

The second determination unit may be configured to determine, when the included angle is less than a preset angle threshold, a distance from the wrist key point to the preset point in the hand detection box.

The third determination unit may be configured to determine the third correlation probability based on the included angle, the distance, and the confidence corresponding to the wrist key point.

In some embodiments, the third determination unit may include a first difference subunit, a second difference subunit, and a first fusion subunit.

The first difference subunit may be configured to determine a first confidence of the distance based on a first difference between the distance and a preset length threshold.

The second difference subunit may be configured to determine a second confidence of the included angle based on a second difference between the included angle and the preset included angle threshold.

The first fusion subunit may be configured to fuse the first confidence, the second confidence, and the confidence corresponding to the wrist key point to obtain the third correlation probability.

In some embodiments, the fourth determination module may include a first correction submodule and a seventh determination submodule.

The first correction submodule may be configured to correct the first correlation probability based on the second correlation probability and the third correlation probability to obtain a corrected first probability.

The seventh determination submodule may be configured to determine the correlation degree between the body to be correlated and the hand to be correlated based on the corrected first probability.

In some embodiments, when the image content of the image to be detected includes multiple bodies to be correlated and multiple hands to be correlated, the seventh determination submodule may include a fourth determination unit, a first screening unit, and a fifth determination unit.

The fourth determination unit may be configured to determine a corrected first probability between each body to be correlated and each hand to be correlated to obtain a corrected first probability set.

The first screening unit may be configured to screen a target corrected first probability with a probability value greater than a preset probability threshold from the corrected first probability set.

The fifth determination unit may be configured to determine the hand to be correlated that is matched with the body to be correlated corresponding to the target corrected first probability based on the target corrected first probability.

In some embodiments, the second determination module may further be configured to determine, when the first correlation probability is greater than the preset probability threshold, the second correlation probability between the body to be correlated and the wrist key point in the key points.

The third determination module may further be configured to determine, when the second correlation probability is greater than the preset probability threshold, the third correlation probability.

The fourth determination module may further be configured to determine, when the third correlation probability is greater than the preset probability threshold, the correlation degree between the body to be correlated and the hand to be correlated based on the first correlation probability, the second correlation probability, and the third correlation probability.

In some embodiments, the apparatus may further include a first fusion module and a first updating module.

The first fusion module may be configured to fuse the first correlation probability, the second correlation probability, and the third correlation probability to obtain a fused probability.

The first updating module may be configured to, when the fused probability is less than a third preset probability threshold, update a position of the wrist key point corresponding to the second correlation probability to obtain an updated wrist key point.

In some embodiments, the apparatus further may include a first detection module.

The first detection module may be configured to perform body detection, hand detection, and human key point detection on the image to be detected to determine the body detection box of the body to be correlated, the hand detection box of the hand to be correlated, and the key points of the body to be correlated.

Correspondingly, the embodiments of the disclosure provide a computer storage medium, having a computer-executable instruction stored thereon. The computer-executable instruction may be executed to implement the body and hand correlation method described above.

The embodiments of the disclosure provide a computer device, which may include a memory and a processor. A computer-executable instruction may be stored in the memory. The processor may run the computer-executable instruction in the memory to implement the body and hand correlation method described above.

The embodiments of the present invention provide a computer program, including computer-readable codes. Execution of the computer-readable codes by a computer causes the computer to implement the body and hand correlation method described above.

According to the body and hand correlation method and apparatus, device, and storage medium provided in the embodiments of the disclosure, for the acquired image to be detected, first, the body to be correlated and hand to be correlated in the image are detected using the detection boxes, and the first correlation probability between the hand detection box and the body detection box is predicted. As such, the first correlation probability between the hand detection box and the body detection box may be predicted using the detection boxes, which may simplify a facility for acquiring a position of the hand to be correlated. Then, the wrist key point of the body is predicted using the body detection box to determine the second correlation probability between the wrist key point and the body detection box, so that accuracy influences brought by a position difference between the wrist key point and the hand may be eliminated. Next, the third correlation probability between the wrist key point and the hand detection box is predicted through the elbow key point and wrist key point on the same arm. Finally, the three correlation probabilities are combined to determine whether the hand to be correlated belongs to the body to be correlated. As such, a hand key point is replaced with the wrist key point, which may reduce the dependence on the accuracy of the body detection box and improve the accuracy of a final correlation result.

DETAILED DESCRIPTION

Figure 1:
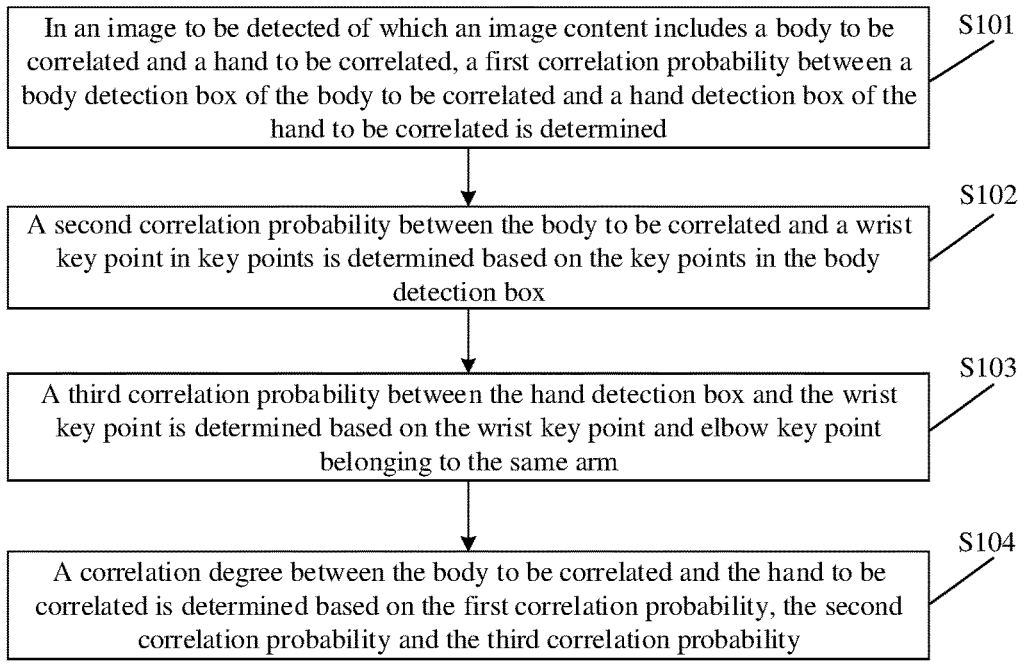
FIG. 1 is a schematic implementation flowchart of a body and hand correlation method according to an embodiment of the disclosure.

In order to make the purposes, technical solutions, and advantages of the embodiments of the disclosure clearer, specific technical solutions of the disclosure will further be described below in combination with the drawings in the embodiments of the disclosure in detail. The following embodiments are intended to describe the disclosure rather than limit the scope of the disclosure.

"Some embodiments" involved in the following descriptions describes a subset of all possible embodiments. However, it is to be understood that "some embodiments" may be the same subset or different subsets of all the possible embodiments, and may be combined without conflicts.

Term "first/second/third" involved in the following descriptions is only for distinguishing similar objects, and does not represent a specific sequence of the objects. It is to be understood that "first/second/third" may be interchanged to specific sequences or orders if allowed to implement the embodiments of the disclosure described herein in sequences except the illustrated or described ones.

Unless otherwise defined, all technological and scientific terms used in the disclosure have meanings the same as those usually understood by those skilled in the art of the disclosure. Terms used in the disclosure are only adopted to describe the embodiments of the disclosure and not intended to limit the disclosure.

Before the embodiments of the disclosure are further described in detail, nouns and terms involved in the embodiments of the disclosure will be described. The nouns and terms involved in the embodiments of the disclosure are suitable for the following explanations.

1) Computer vision, as a science researching how to make machines "see", refers to identifying, tracking, and measuring targets using video cameras and computers instead of human eyes, and further performing image processing.

2) A greedy algorithm refers to that a presently best choice is always made when a problem is solved. That is, instead of considering the overall optimization, the greedy algorithm only obtains a locally optimal solution in some sense.

An exemplary application of a body and hand correlation device provided in the embodiments of the disclosure will be described below. The device provided in the embodiments of the disclosure may be implemented as various types of user terminals with an image collection function, such as a notebook computer, a tablet computer, a desktop computer, a camera, and a mobile device (e.g., a personal digital assistant, a dedicated messaging device, and a portable game device), or may be implemented as a server. An exemplary application of the device implemented as a terminal or a server will be described below.

A method may be applied to a computer device. A function realized by the method may be realized by calling a program code through a processor in the computer device. Of course, the program code may be stored in a computer storage medium. It can be seen that the computer device at least includes the processor and the storage medium.

The embodiments of the disclosure provide a body and hand correlation method. As illustrated in FIG. 1, descriptions will be made in combination with operations illustrated in FIG. 1.

In S101, in an image to be detected of which an image content includes a body to be correlated and a hand to be correlated, a first correlation probability between a body detection box of the body to be correlated and a hand detection box of the hand to be correlated is determined.

In some embodiments, the image to be detected may be a color image, or may be a gray image. Correspondingly, the body to be correlated and the hand to be correlated may be in a foreground region, medium shot region, and background region of the image to be detected. The body to be correlated in the image to be detected refers to a body of which all or part of body information may be presented in the image to be detected. Correspondingly, the hand to be correlated in the image to be detected may refer to left hand information, right hand information, left and right hand information, etc., presented in the image to be detected.

In some embodiments, a posture of the body to be correlated in the image to be detected may be standing, walking, sitting, etc. Correspondingly, a posture of the hand to be correlated in the image to be detected may be unclenched or clenched, or may be partially clenched, etc.

In some embodiments, the image content of the image to be detected includes, but not limited to, the body to be correlated and the hand to be correlated. The image to be detected may present that the body to be correlated and hand to be correlated in the image content may be in any scene, such as a classroom, a park, an office, or a game place. In addition, the image content in the image to be detected may include one, two or more than two bodies to be correlated and hands to be correlated. Correspondingly, a relative positional relationship between the body to be correlated and hand to be correlated in the image content of the image to be detected may be left-right, front-back, one under the other, etc.

In some possible implementation modes, body detection, hand detection, and human key point detection are performed on the image to be detected to determine the body detection box of the body to be correlated, the hand detection box of the hand to be correlated, and the key points of the body to be correlated. First, the image to be detected of which the image content includes the body to be correlated and the hand to be correlated is acquired. The image to be detected may be an image collected in any scene, e.g., an image collected in a game place including multiple players and hands of the players. The body to be correlated is a player body, and the hand to be correlated is a player hand. The image to be detected includes at least one body to be correlated and at least two hands to be correlated. Then, body detection boxes of all bodies to be correlated and hand detection boxes of all hands to be correlated are predicted using a detection model in the image to be detected. Finally, feature extraction is performed on the body detection box and the hand detection box, and the correlation probability between the body detection box and the hand detection box may be determined based on an extracted hand feature and body feature to obtain the first correlation probability. The first correlation probability represents a probability that the hand to be correlated belongs to the body to be correlated. As such, when there are multiple bodies to be correlated and multiple hands to be correlated, for each pair of fixed hand to be correlated and body to be correlated, detection boxes of the hand to be correlated and the body to be correlated may be determined respectively to obtain a correlation probability of the pair of hand to be correlated and body to be correlated.

In S102, a second correlation probability between the body to be correlated and a wrist key point in key points is determined based on the key points in the body detection box.

In some embodiments, the key points in the body detection box include the wrist key point and elbow key point belonging to the same arm. The key points at least include a wrist key point and elbow key point of each arm, and may further include the head, the neck, the shoulder, the elbow, the hand, the hips, the knee, the foot, and other parts. For example, elbow key points of the left arm and the right arm and wrist key points of the left arm and the right arm are included. For each arm, a correlation probability between the wrist key point and the body to be correlated is determined based on a confidence of the wrist key point on the arm to obtain a second correlation probability. The second correlation probability represents a probability that the wrist key point belongs to the body to be correlated.

In some possible implementation modes, position information of the wrist key point is predicted to determine a confidence that the wrist key point is a truth point, and the confidence is determined as the correlation probability, i.e., the second correlation probability, between the body to be correlated and the wrist key point.

The operation in S102 may be performed concurrently with the operation in S101. That is, for any body to be correlated, a correlation probability of the pair of body to be correlated and hand to be correlated is determined. Meanwhile, a wrist key point is determined in a body detection box of the body to be correlated, and a second correlation probability between the wrist key point and the body to be correlated is determined.

In S103, a third correlation probability between the hand detection box and the wrist key point is determined based on the wrist key point and elbow key point belonging to the same arm.

In some embodiments, the third correlation probability represents a probability that the hand to be correlated in the hand detection box and the wrist key point belong to the same arm. Confidences of the wrist key point and elbow key point belonging to the same arm are analyzed, and when the confidences of the wrist key point and elbow key point belonging to the same arm are both greater than a certain threshold, the correlation probability between the hand detection box and the wrist key point is determined.

In some possible implementation modes, first, a preset range of an included angle is set, and the included angle is an included angle formed by a connecting line connecting the wrist key point and elbow key point belonging to the same arm and a connecting line connecting the wrist key point and a preset point in the hand detection box. Then, the hand detection box is searched within a certain distance from the wrist key point in the preset range of the included angle. Finally, if the hand detection box can be found, the third correlation probability between the hand detection box and the wrist key point is determined.

In S104, a correlation degree between the body to be correlated and the hand to be correlated is determined based on the first correlation probability, the second correlation probability, and the third correlation probability.

In some embodiments, the correlation degree between the body to be correlated and the hand to be correlated represents a probability that the hand to be correlated belongs to the body to be correlated. That is, when the correlation degree between the body to be correlated and the hand to be correlated is relatively high, it is determined that the hand to be correlated belongs to the body to be correlated. Alternatively, when the correlation degree between the body to be correlated and the hand to be correlated is relatively low, it is determined that the hand to be correlated does not belong to the body to be correlated.

In some possible implementation modes, the first correlation probability is adjusted using the second correlation probability and the third correlation probability, and it is determined whether the hand to be correlated belongs to the body to be correlated using a greedy algorithm or a KM algorithm, etc., based on the adjusted first correlation probability.

In the embodiments of the disclosure, for the acquired image to be detected, first, the body to be correlated and hand to be correlated in the image are detected using the detection boxes, and the first correlation probability between the hand detection box and the body detection box is predicted. As such, the first correlation probability between the hand detection box and the body detection box may be predicted using the detection boxes, which may simplify a facility for acquiring a position of the hand to be correlated. Then, the wrist key point of the body is predicted using the body detection box to determine the second correlation probability between the wrist key point and the body detection box, so that accuracy influences brought by a position difference between the wrist key point and the hand may be eliminated. Next, the third correlation probability between the wrist key point and the hand detection box is predicted through the elbow key point and wrist key point on the same arm. Finally, the three correlation probabilities are combined to determine whether the hand to be correlated belongs to the body to be correlated. As such, a hand key point is replaced with the wrist key point, which may reduce the dependence on the accuracy of the body detection box and improve the final correlation accuracy.

Besides executed in parallel, the operations in S101 to S104 may be executed progressively. That is, in the four execution operations, a correlation probability greater than a certain threshold may be selected in each operation, and when the correlation probability is greater than the certain threshold, the next operation is performed. This manner may be implemented through the following operations.

At block 1, when the first correlation probability is greater than a preset probability threshold, the second correlation probability between the body to be correlated and the wrist key point in the key points is determined.

In some embodiments, a prediction process of the second correlation probability between the body to be correlated and the wrist key point is implemented through block 1. It is determined whether the correlation probability between the body detection box of the body to be correlated and the hand detection box of the hand to be correlated is greater than the preset probability threshold. For example, the preset probability threshold is set to 0.8. If the first correlation probability is less than the preset probability threshold, it indicates that a correlation between the body detection box of the body to be correlated and the hand detection box of the hand to be correlated is quite low, and it further indicates that the hand to be correlated and the body to be correlated do not belong to the same person. In such case, the body to be correlated may be continued to be matched with another hand to be correlated. If the first correlation probability is greater than the preset probability threshold, it indicates that the correlation between the body detection box of the body to be correlated and the hand detection box of the hand to be correlated is relatively high, and it further indicates that the hand to be correlated and the body to be correlated may belong to the same person. For analyzing whether the hand to be correlated and the body to be correlated belong to the same person more accurately, the wrist key point is determined in the body detection box of the body to be correlated, and the second correlation probability between the body to be correlated and the wrist key point is determined.

At block 2, when the second correlation probability is greater than the preset probability threshold, the third correlation probability is determined.

In some embodiments, the third correlation probability between the hand detection box and the wrist key point is predicted through block 2. The second correlation probability may be represented by a confidence corresponding to the wrist key point. When the confidence of the wrist key point is relatively high, the correlation probability between the wrist key point and the hand detection box is continued to be predicted. As such, a wrist key point with a relatively low confidence may be filtered.

At block 3, when the third correlation probability is greater than the preset probability threshold, the correlation degree between the body to be correlated and the hand to be correlated is determined based on the first correlation probability, the second correlation probability, and the third correlation probability.

In some embodiments, the correlation degree between the body to be correlated and the hand to be correlated is predicted through block 3. When the correlation probability between the wrist key point and the hand detection box is also relatively high, the three relatively high correlation probabilities are fused to determine the correlation degree between the body to be correlated and the hand to be correlated to further determine that the body to be correlated is matched with the hand to be correlated. As such, the correlation probability between the body to be correlated and the wrist key point and the correlation probability between the wrist key point and the hand detection box may be determined progressively to filter relatively low probabilities and further improve the accuracy of matching the body to be correlated and the hand to be correlated.

In some embodiments, the body to be correlated and the hand to be correlated are detected using a detection network to determine position information of the hand to be correlated, thereby predicting the correlation probability between the hand detection box and the body detection box. That is, the operation in S101 may be implemented through the following actions.

In S111, a body feature in the body detection box and a hand feature in the hand detection box are determined.

In some embodiments, feature extraction is performed on the body in the body detection box using the detection network to obtain the body feature. The detection network may be a convolutional neural network. Feature extraction is performed on the hand in the hand detection box using the network to obtain the hand feature.

In S112, the first correlation probability between the body detection box and the hand detection box is determined based on the body feature and the hand feature.

In some embodiments, position information of the hand to be correlated on the body is analyzed using the detection network based on the hand feature. A correlation between the body feature and the hand feature may be predicted through the position information, thereby determining the first correlation probability between the body detection box and the hand detection box. As such, the position information of the hand to be correlated may be obtained using a detection network, which can not only predict the correlation probability between the hand detection box and the body detection box accurately but also simplify a facility for predicting the correlation probability.

In some embodiments, a key point of the body may be predicted using the body detection box to optimize the confidence of the predicted key point. That is, the operation in S102 may be implemented through the following actions.

In S121, a confidence that the wrist key point is a truth point is determined.

In some embodiments, for the detected body detection box, key point detection is performed on the body in the body detection box using a human key point detection network. When the human key point detection network predicts position information of key points, a confidence of each key point is obtained. In some possible implementation modes, if a position of a key point is occluded, a relatively low confidence is output. Alternatively, if the position of the key point is relatively clear, a relatively high confidence is output.

In S122, a correlation probability between the body to be correlated and the wrist key point is determined based on the confidence to obtain the second correlation probability.

In some embodiments, the confidence of the wrist key point on the body is predicted through the human key point detection network. The confidence represents a probability that the wrist key point is a truth key point on the body to be correlated. In some possible implementation modes, the confidence is determined as the second correlation probability. As such, the confidence of the wrist key point is determined as the correlation probability, i.e., the second correlation probability, between the body to be correlated and the wrist key point.

In some possible implementation modes, for each pair of hand to be correlated and body to be correlated, in the image to be detected, a confidence of each wrist key point is predicted using the human key point detection network. If the confidence of the wrist key point is less than a certain threshold, the wrist key point is deleted or ignored. If the confidence of the wrist key point is greater than the certain threshold, the confidence of the wrist key point is determined as a correlation probability between the body to be correlated and the wrist key point. As such, the confidence of the wrist key point may be predicted using the key point detection network to optimize a finally obtained result.

Figure 2:
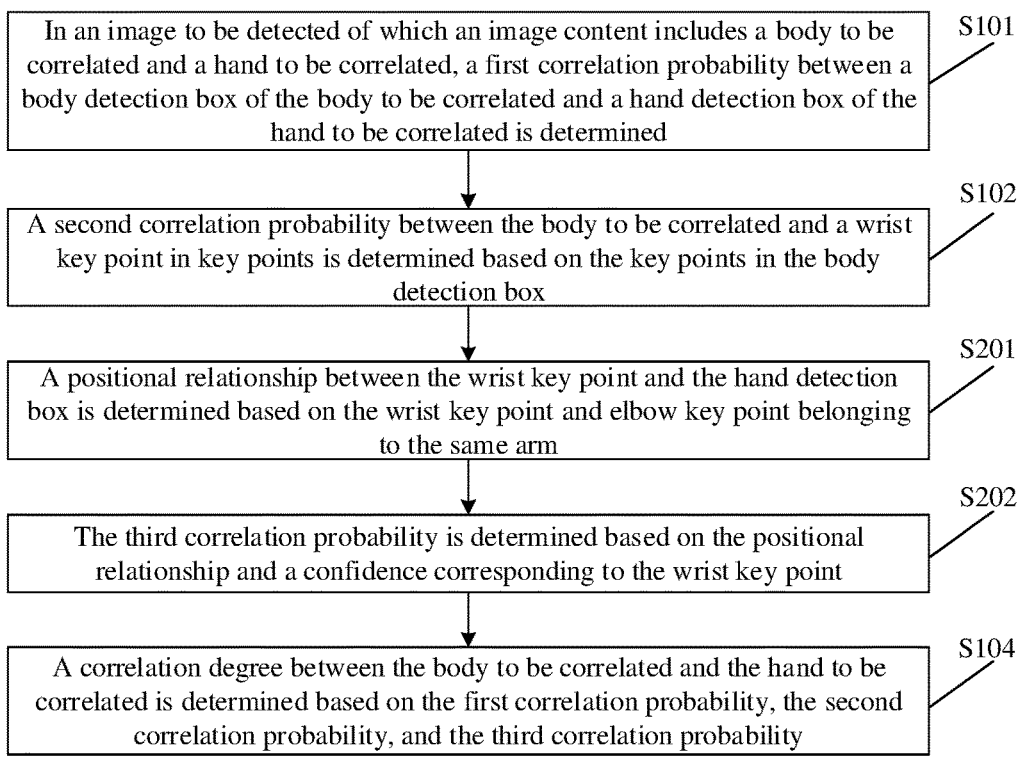
FIG. 2 is another schematic implementation flowchart of a body and hand correlation method according to an embodiment of the disclosure.

In some embodiments, the operation in S103 may be implemented through the operations illustrated in FIG. 2. FIG. 2 is another implementation flowchart of a body and hand correlation method according to an embodiment of the disclosure. The following descriptions are made in combination with FIG. 1 and FIG. 2.

In S201, a positional relationship between the wrist key point and the hand detection box is determined based on the wrist key point and elbow key point belonging to the same arm.

In some embodiments, the positional relationship between the wrist key point and the hand detection box is analyzed according to the position information of the wrist key point and elbow key point belonging to the same arm. For example, a relative positional relationship between the wrist key point and a center point in the hand detection box is determined.

In some possible implementation modes, the wrist key point is introduced, and positions of the elbow key point and wrist key point of the same arm are combined to predict the correlation probability between the wrist key point and the hand detection box. That is, the operation in S201 may be implemented through the following actions.

In S211, a first connecting line connecting the elbow key point and wrist key point belonging to the same arm is determined.

For example, in the body detection box, the elbow key point and wrist key point on the same arm are connected to obtain the first connecting line.

In S212, a second connecting line connecting the wrist key point and a preset point in the hand detection box is determined.

In some embodiments, the preset point is a position capable of representing a position of the hand detection box, and may be the center point in the hand detection box or any point on a centerline along a finger direction in the hand detection box. For example, if the preset point is the center point, the wrist key point on the arm is connected with the center point in the hand detection box to obtain the second connecting line.

In S213, an included angle between the first connecting line and the second connecting line is determined by taking the wrist key point as a vertex along a forearm direction of the arm to obtain the positional relationship.

In some embodiments, the first connecting line and the second connecting line are half-lines taking the wrist key point as a vertex. The included angle between the two half-lines is determined along the forearm direction of the arm. The included angle is determined as the positional relationship between the wrist key point and the hand detection box. As such, the wrist key point is introduced, the wrist key point is connected with the elbow key point, the wrist key point is connected with the center point in the hand detection box, and the included angle between the two connecting lines represents the positional relationship between the wrist key point and the hand detection box. Therefore, the dependence on the accuracy of the body detection box may be reduced.

In S202, the third correlation probability is determined based on the positional relationship and a confidence corresponding to the wrist key point.

In some embodiments, the confidence corresponding to the wrist key point includes the confidence that the wrist key point is a truth point. The reasonability of the positional relationship between the wrist key point and the hand detection box compared with conventional structures of a wrist and hand of a body is analyzed. A weight is allocated to the positional relationship according to the reasonability, a weight is allocated to the wrist key point according to the confidence corresponding to the wrist key point, and weighted fusion is performed on a confidence of the positional relationship and the confidence corresponding to the wrist key point using the obtained weights to obtain a probability representing that the wrist key point and the hand detection box belong to the same arm, i.e., the third correlation probability. As such, by analyzing the reasonability of the positional relationship may be analyzed and combining with the confidence of the wrist key point, it is able to predict the correlation probability between the wrist key point and the hand detection box more accurately.

In some possible implementation modes, it is judged whether the positional relationship between the wrist key point and the hand detection box is reasonable at first, and then a distance from the wrist key point to the hand detection box is judged, so that the accuracy of predicting the third correlation probability may be improved. That is, the operation in S202 may be implemented through the following actions.

In S221, when the included angle is less than a preset angle threshold, a distance from the wrist key point to the preset point in the hand detection box is determined.

In some embodiments, the preset angle threshold may be set based on a maximum angle that the wrist of the body may be bent. For example, the preset angle threshold is set to be more than or equal to 0° and less than or equal to 90°. It is analyzed whether the included angle between the first connecting line and the second connecting line is less than the preset angle threshold. If the included angle is greater than the preset angle threshold, it indicates that the hand detection box and the wrist key point do not belong to the same hand. If the included angle is less than the preset angle threshold, it indicates that the hand detection box and the wrist key point may belong to the same hand, so the distance from the wrist key point to the hand detection box is further judged.

In some possible implementation modes, the distance may be a distance from the wrist key point to the preset point in the hand detection box, e.g., a distance from the wrist key point to the center point in the hand detection box.

In some possible implementation modes, if the hand detection box may be found in a certain included angle range, the distance from the wrist key point to the hand detection box is further judged through the following process.

At block 1, the included angle is subtracted from the preset included angle threshold to obtain a first difference.

In some embodiments, the difference between the included angle of the first connecting line and the second connecting line and the preset included angle threshold is analyzed. For example, the preset included angle threshold is 90°, and the included angle is subtracted from 90° to obtain the first difference.

At block 2, when the first difference is less than 0, the distance from the wrist key point to the hand detection box is determined.

In some embodiments, if the first difference is less than 0, it indicates that the positional relationship between the wrist key point in the first connecting line and the preset point in the hand detection box in the second connecting line is reasonable. Under the condition of judging that the positional relationship between the wrist key point and the preset point in the hand detection box is reasonable, the distance from the wrist key point to the hand detection box is further determined, so that the accuracy of predicting the third correlation probability may be improved.

In S222, the third correlation probability is determined based on the included angle, the distance, and the confidence corresponding to the wrist key point.

In some embodiments, the reasonability of the included angle and the distance is analyzed to determine weights of the included angle and the distance, and a weight of the confidence is determined according to the confidence of the wrist key point. Weighted sum is performed on a confidence of the included angle, a confidence of the distance, and the confidence corresponding to the wrist key point using the obtained weights to determine the probability that the wrist key point and the hand in the hand detection box are the same hand, i.e., the third correlation probability. As such, the reasonability of the included angle and the distance may be combined with the confidence corresponding to the wrist key point to improve the accuracy of the obtained third correlation probability.

In some possible implementation modes, a difference between the distance and a preset length threshold and the difference between the included angle and the preset angle threshold are analyzed to determine the reasonability of the distance and the included angle, thereby obtaining the third correlation probability. That is, the operation in S222 may be implemented through the following actions.

At block 1, a first confidence of the distance is determined based on a first difference between the distance and a preset length threshold.

In some embodiments, the preset length threshold may be set according to a height and arm length of the body to be correlated. For example, if the height is greater or the arm length is greater, the preset length threshold is set to be greater. Alternatively, the preset length threshold is set to be positively proportional to the height. The preset length threshold represents a maximum distance, consistent with a body structure, between the wrist key point of the body to be correlated and a center point of the hand, i.e., a maximum distance from a wrist key point to a center point of a hand for a human body of a normal structure. The difference between the distance and the preset length threshold is analyzed, and the difference represents a difference between the distance and a maximum reasonable distance from the wrist key point to the center point of the hand. If the distance is greater than the preset length threshold, it is determined that the correlation degree between the hand to be correlated in the hand detection box and the wrist key point is quite low, and the wrist key point may be discarded. If the distance is far less than the preset length threshold, and is inconsistent with a body structure of the body to be correlated under this height, it is determined that the correlation degree between the hand to be correlated in the hand detection box and the wrist key point is quite low, and the first confidence of the distance is set to be relatively low. If the distance is slightly less than the preset length threshold, it is determined that the correlation degree between the hand to be correlated in the hand detection box and the wrist key point is relatively high, and the first confidence of the distance is set to be relatively high.

At block 2, a second confidence of the included angle is determined based on a second difference between the included angle and the preset included angle threshold.

In some embodiments, the difference between the included angle and the preset included angle threshold is analyzed, and the difference represents a difference between the included angle and the maximum angle that the wrist may be bent. If the included angle is greater than the preset included angle threshold, it is determined that the hand to be correlated in the hand detection box and the wrist key point do not belong to the same arm, and the wrist key point may be discarded. If the included angle is less than the preset included angle threshold, it is determined that the hand to be correlated in the hand detection box and the wrist key point may be correlated, and the second confidence is set to be relatively high.

At block 3, the first confidence, the second confidence, and the confidence corresponding to the wrist key point are fused to obtain the third correlation probability.

In some embodiments, three weights are allocated to the first confidence, the second confidence, and the confidence corresponding to the wrist key point according to magnitudes of the three confidences respectively, the weights are multiplied by the three confidences respectively and then added together to obtain the third correlation probability.

In the embodiment of the disclosure, for each pair of detected elbow key point and wrist key point on the same arm, a hand detection box is searched within a certain distance from the wrist key point in the vicinity of an extending direction of the forearm, namely in a range of the preset included angle threshold, so that a correlation probability between the wrist key point and the hand detection box may be predicted accurately using positions of the elbow key point, the wrist key point, and the hand detection box.

In some embodiments, the operation in S104 may be implemented through the following actions.

In S141, the first correlation probability is corrected based on the second correlation probability and the third correlation probability to obtain a corrected first probability.

In some embodiments, the correlation probability between the body detection box of the body to be correlated and the hand detection box is corrected using the correlation probability between the body to be correlated and the wrist key point and the correlation probability between the wrist key point and the hand detection box. If both the correlation probability between the body to be correlated and the wrist key point and the correlation probability between the wrist key point and the hand detection box are relatively low, the correlation probability between the body detection box and the hand detection box is decreased. For example, the first correlation probability is decreased to a constant, or, the first correlation probability is divided by a constant, or, a constant is subtracted from the first correlation probability. Conversely, if both the correlation probability between the body to be correlated and the wrist key point and the correlation probability between the wrist key point and the hand detection box are relatively high, the correlation probability between the body detection box and the hand detection box is increased appropriately.

In S142, the correlation degree between the body to be correlated and the hand to be correlated is determined based on the corrected first probability.

In some embodiments, the corrected first probability is obtained, and a locally optimal solution is determined using the greedy algorithm or the like, thereby determining the correlation degree between the body to be correlated and the hand to be correlated to further determine whether the body to be correlated and the hand to be correlated belong to the same person. As such, by determining the correlation probabilities between every two in a triple of the body to be correlated, the hand to be correlated, and the wrist key point, the correlation probability between the body to be correlated and the hand to be correlated is corrected. The wrist key point is introduced as a medium to reduce the dependence on the accuracy of the body detection box and optimize the finally determined correlation degree between the body to be correlated and the hand to be correlated.

In some possible implementation modes, when the body to be correlated includes multiple bodies and the hand to be correlated includes multiple hands, obtained multiple corrected first probabilities are processed using the greedy algorithm, etc., to obtain a final correlation result through the following process.

At block 1, a corrected first probability between each body to be correlated and each hand to be correlated is determined to obtain a corrected first probability set.

In some embodiments, in a scene such as a game place or a classroom, the image to be detected includes multiple bodies to be correlated and multiple hands to be correlated. For each body to be correlated and each hand to be correlated, processing is performed through the process illustrated in S141 and S142 to obtain a corrected first probability of each pair of body to be correlated and hand to be correlated. As such, multiple corrected first probabilities, i.e., a corrected first probability set, may be obtained.

At block 2, a target corrected first probability with a probability value greater than the preset probability threshold is screened from the corrected first probability set.

In some embodiments, the corrected first probabilities in the corrected first probability set are screened according to a certain preset probability threshold to obtain the corrected first probability with a relatively great probability value, i.e., the target corrected first probability.

At block 3, the hand to be correlated that is matched with the body to be correlated corresponding to the target corrected first probability is determined based on the target corrected first probability.

In some embodiments, there is at least one target corrected first probability. A logic operation may be performed on the obtained target corrected first probability using the greedy algorithm to pair the hand to be correlated and the body to be correlated. That is, multiple bodies to be correlated and multiple hands to be correlated in the image to be detected are matched to determine the body to be correlated and hand to be correlated belonging to the same person. As such, a corrected first probability with a relatively small probability value may be filtered from the multiple corrected first probabilities using a certain probability threshold to reduce the calculation amount for matching the hands to be correlated and the bodies to be correlated.

In some embodiments, the correlation probabilities between every two of the hand to be correlated, the body to be correlated, and the wrist key point may be added to determine whether the wrist key point may be provided for the hand to be correlated and the body to be correlated, which may be implemented through the following operations.

At block 1, the first correlation probability, the second correlation probability, and the third correlation probability are fused to obtain a fused probability.

In some embodiments, the first correlation probability, the second correlation probability, and the third correlation probability are added to obtain a total score. The total score is determined as the fused probability to judge whether the wrist key point involved in the second correlation probability and the third correlation probability is suitable to be used for the pair of hand to be correlated and body to be correlated corresponding to the first correlation probability.

At block 2, when the fused probability is less than a third preset probability threshold, a position of the wrist key point corresponding to the second correlation probability is updated to obtain an updated wrist key point.

In some embodiments, if the fused probability is less than the third preset probability threshold, it indicates that both correlations between the wrist key point and each of the body to be correlated and the hand detection box of the hand to be correlated are relatively low, and it further indicates that the wrist key point and the hand to be correlated do not belong to the same arm, or the wrist key point and the hand to be correlated do not belong to the same person, etc. Based on this, the body detection box is searched for another wrist key point to obtain the updated wrist key point. Alternatively, the position of the wrist key point is adjusted according to the magnitude of the second correlation probability to obtain the updated wrist key point. As such, the three correlation probabilities may be fused to find the wrist key point suitable to be used for the pair of body to be correlated and hand to be correlated, so as to further improve the accuracy of the finally updated second correlation probability.

An exemplary application of the embodiment of the disclosure to a practical application scene will be described below. Taking a game place as an example, descriptions will be made with correlation of a body and hand of a player in a game place as an example.

A body and hand correlation algorithm has a relatively high application value in a scene such as the game place. In a complex scene such as the game place, the number of bodies in a field of view is relatively large, and conditions that arms are staggered are usually complex, so it is difficult to obtain a good prediction result using the body and hand correlation algorithm or a key point detection algorithm.

In the related art, the body and hand detection and correlation algorithm is used to predict a correlation probability of each pair of body and hand, or a human key point detection technology is used to detect a hand key point of each body, and is simultaneously combined with another sensor to judge the body that the hand belongs to. It is difficult to eliminate conditions that hands are stretched out, arms are staggered, etc., using the body and hand detection and correlation algorithm. The human key point detection network depends much on the accuracy of a body detection box, and also requires introduction of the other sensor, which increases additional cost. In addition, in most open-source human key point methods, only wrist key points are detected, and hand key points are not detected. A wrist key point is influenced by a posture of a hand, and is not always in a range of the hand, thereby increasing difficulties in logic design of the algorithm.

A position and size of the whole hand cannot be obtained only using hand key points, and judgment of correlation information of the body and the hand using a human key point network requires introduction of an additional sensor to judge the position of the hand, which may bring additional cost. Moreover, in the related art, the wrist key point is detected in the human key point detection method, while a distance difference between the wrist key point and the hand may affect the robustness of the algorithm, and thus it is difficult to solve problems about correlation in some complex scenes.

Based on this, in the embodiments of the disclosure, the body and hand correlation algorithm is optimized by human key point detection without introducing any additional sensor, so that accuracy influences brought by a position difference between the wrist key point and the hand may be eliminated, and higher performance is achieved in a complex scene. The following implementation process may be performed.

At block 1, all body detection boxes and hand detection boxes in an image are predicted using a detection network.

At block 2, for each 2-tuple in the body detection boxes and the hand detection boxes, a correlation probability of this pair of body and hand is predicted using a correlation branch of the detection network.

At block 3, for a detected body detection box, key point detection is performed using a human key point network.

Figure 3:
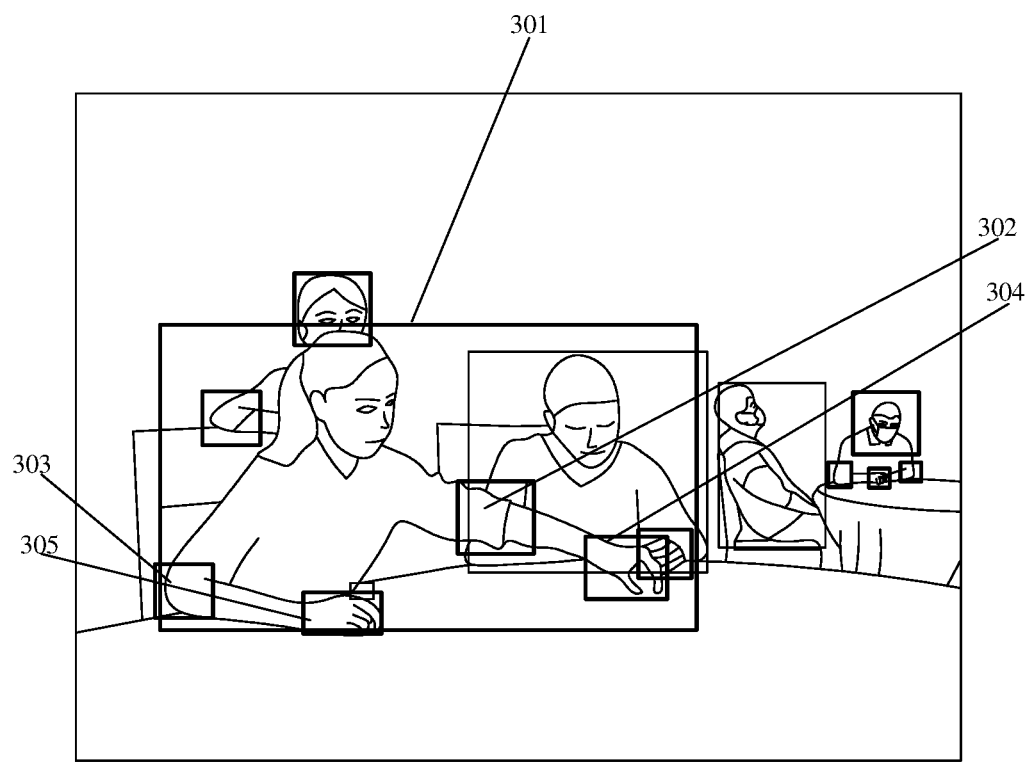
FIG. 3 is a schematic diagram of an application scene of a body and hand correlation method according to an embodiment of the disclosure.

In some embodiments, key points requiring attention in a detection result include an elbow key point (elbow_l) of the left arm, an elbow key point (elbow_r) of the right arm, a wrist key point (wrist_l) of the left arm, and a wrist key point (wrist_r) of the right arm. Meanwhile, confidences of the two wrist key points of each body are obtained, and the confidences are determined as correlation probabilities between the body and the wrist key points. As illustrated in FIG. 3, taking a body 301 as an example, key points of the body 301 includes an elbow key point 302 of the left arm, an elbow key point 303 of the right arm, a wrist key point 304 of the left arm, and a wrist key point 305 of the right arm. Confidences of the wrist key points 304 and 305 are determined as correlation probabilities between the body and the wrist key points.

At block 4, for each pair of elbow key point and wrist key point, detected in block 3, on the same arm, a hand detection box on the arm is searched, and a wrist-hand correlation probability is predicted using positions of the elbow key point, the wrist key point, and the hand detection box.

In some embodiments, the hand detection box of the arm is searched within a certain distance from the wrist in the vicinity of an extending direction of the forearm of the arm (for example, an included angle is in a certain range). In some possible implementation modes, for the same arm, first, an included angle range is set (for example, the included angle range is set to be less than 90°) for an included angle between a connecting line connecting the elbow key point to the wrist key point and a connecting line connecting the wrist key point to a preset point in the hand detection box. Then, a preset distance is set for a distance between the preset point in the hand detection box and the wrist key point. The hand detection box on the arm is searched within a distance that satisfies the preset distance from the wrist along the extending direction of the forearm according to the included angle range. The distance may be determined based on a length of the forearm and a height of the body. The wrist-hand correlation probability may be obtained as follows: a relationship of the included angle between the connecting line connecting the preset point in the practically found hand detection box and the wrist key point and the connecting line connecting the elbow key point and the wrist key point and the set included angle range is judged, a confidence of the practically formed included angle and a confidence between the distance from the preset point in the practically found hand detection box to the wrist key point and the preset distance are determined, and the confidence of the included angle, the confidence of the distance, and confidences of the wrist key point and the elbow key point are combined to predict the wrist-hand correlation probability.

In another possible implementation mode, the confidence of the included angle, the confidence of the distance, the confidences of the wrist key point and the elbow key point, etc., may be encoded and then input to a neural network of a simple structure to predict the wrist-hand correlation probability.

At block 5, the correlation probabilities, obtained from block 1 to block 4, between every two in a body-wrist-hand triple are combined, and the obtained correlation probabilities are processed using a greedy algorithm, etc., to obtain a final correlation result.

In a specific example, the image to be detected is an image collected in the game place. The body to be correlated is a player body, and the hand to be correlated is a player hand. Through block 1 to block 4, firstly, a first correlation probability between a body detection box of each player body and a hand detection box of each player hand is determined. Then, a body key point is determined from the body detection box of the player body, and a confidence of a wrist key point is determined a second correlation probability between the wrist key point and the player body. Key points requiring attention at least include elbow key points of the left arm and the right arm, and wrist key points of the left arm and the right arm. Next, a third correlation probability between the wrist key point and the player hand is predicted through the detected wrist key point and elbow key point. Then, the first correlation probability is corrected using the second correlation probability and the third correlation probability to obtain a corrected first probability. Finally, the corrected first probability is input to the greedy algorithm to implement pairing of the player body and the player hand. As such, the player hand and body in the complex game place may be matched to monitor game currency placement or payment of the player or other processes in a game process more effectively.

In the embodiments of the disclosure, the hand and body detection and correlation method is used to detect the body box and the hand box and predict correlation information of the hand and the body. The wrist key point is predicted using the body box, and the result is determined as body-wrist correlation information. Wrist-hand correlation information is predicted according to positions of some key points on the arm and position information of the hand. The three pieces of correlation information are combined to obtain a final correlation prediction result. As such, the position of the hand is obtained using the detection network to simplify a facility for hand and body correlation. The correlation result is optimized using the key point network, so that the final correlation accuracy is improved. The hand key point is replaced with the wrist key point, so that the requirement may be met using most open-source networks, and meanwhile, the dependence on the accuracy of the body detection box may be reduced.

Figure 4:
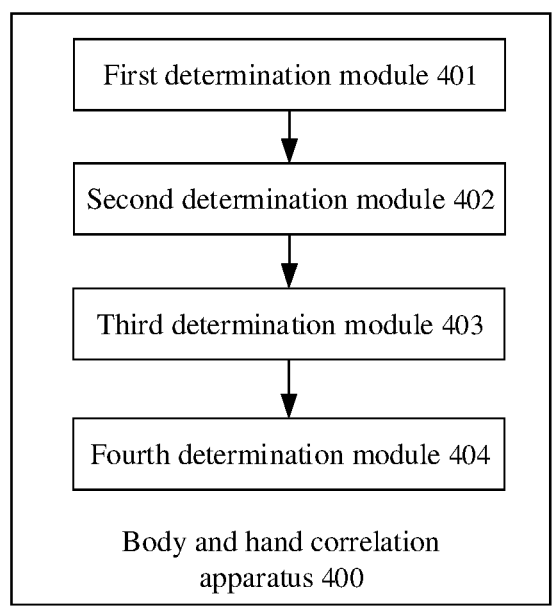
FIG. 4 is a structure composition diagram of a body and hand correlation apparatus according to an embodiment of the disclosure.

The embodiments of the disclosure provide a body and hand correlation apparatus. FIG. 4 is a structure composition diagram of a body and hand correlation apparatus according to an embodiment of the disclosure. As illustrated in FIG. 4, the body and hand correlation apparatus 400 includes a first determination module 401, a second determination module 402, a third determination module 403, and a fourth determination module 404.

The first determination module 401 is configured to determine, in an image to be detected of which an image content includes a body to be correlated and a hand to be correlated, a first correlation probability between a body detection box of the body to be correlated and a hand detection box of the hand to be correlated.

The second determination module 402 is configured to determine a second correlation probability between the body to be correlated and a wrist key point in key points based on the key points in the body detection box, the key points in the body detection box including the wrist key point and elbow key point belonging to the same arm.

The third determination module 403 is configured to determine a third correlation probability between the hand detection box and the wrist key point based on the wrist key point and elbow key point belonging to the same arm.

The fourth determination module 404 is configured to determine a correlation degree between the body to be correlated and the hand to be correlated based on the first correlation probability, the second correlation probability, and the third correlation probability.

In some embodiments, the first determination module 401 includes a first determination submodule and a second determination submodule.

The first determination submodule is configured to determine a body feature in the body detection box and a hand feature in the hand detection box.

The second determination submodule is configured to determine the first correlation probability between the body detection box and the hand detection box based on the body feature and the hand feature.

In some embodiments, the second determination module 402 includes a third determination submodule and a fourth determination submodule.

The third determination submodule is configured to determine a confidence that the wrist key point is a truth point.

The fourth determination submodule is configured to determine a correlation probability between the body to be correlated and the wrist key point based on the confidence to obtain the second correlation probability.

In some embodiments, the second determination module 402 is further configured to determine the confidence as the second correlation probability.

In some embodiments, the third determination module 403 includes a fifth determination submodule and a sixth determination submodule.

The fifth determination submodule is configured to determine a positional relationship between the wrist key point and the hand detection box based on the wrist key point and elbow key point belonging to the same arm.

The sixth determination submodule is configured to determine the third correlation probability based on the positional relationship and a confidence corresponding to the wrist key point.

In some embodiments, the fifth determination submodule includes a first connecting unit, a second connecting unit, and a first determination unit.

The first connecting unit is configured to determine a first connecting line connecting the wrist key point and elbow key point belonging to the same arm.

The second connecting unit is configured to determine a second connecting line connecting the wrist key point and a preset point in the hand detection box.

The first determination unit is configured to determine an included angle between the first connecting line and the second connecting line by taking the wrist key point as a vertex along a forearm direction of the arm to obtain the positional relationship.

In some embodiments, the sixth determination submodule includes a second determination unit and a third determination unit.

The second determination unit is configured to determine, when the included angle is less than a preset angle threshold, a distance from the wrist key point to the preset point in the hand detection box.

The third determination unit is configured to determine the third correlation probability based on the included angle, the distance, and the confidence corresponding to the wrist key point.

In some embodiments, the third determination unit includes a first difference subunit, a second difference subunit, and a first fusion subunit.

The first difference subunit is configured to determine a first confidence of the distance based on a first difference between the distance and a preset length threshold.

The second difference subunit is configured to determine a second confidence of the included angle based on a second difference between the included angle and the preset included angle threshold.

The first fusion subunit is configured to fuse the first confidence, the second confidence, and the confidence corresponding to the wrist key point to obtain the third correlation probability.

In some embodiments, the fourth determination module 404 includes a first correction submodule and a seventh determination submodule.

The first correction submodule is configured to correct the first correlation probability based on the second correlation probability and the third correlation probability to obtain a corrected first probability.

The seventh determination submodule is configured to determine the correlation degree between the body to be correlated and the hand to be correlated based on the corrected first probability.

In some embodiments, when the image content of the image to be detected includes multiple bodies to be correlated and multiple hands to be correlated, the seventh determination submodule includes a fourth determination unit, a first screening unit, and a fifth determination unit.

The fourth determination unit is configured to determine a corrected first probability between each body to be correlated and each hand to be correlated to obtain a corrected first probability set.

The first screening unit is configured to screen a target corrected first probability with a probability value greater than a preset probability threshold from the corrected first probability set.

The fifth determination unit is configured to determine the hand to be correlated that is matched with the body to be correlated corresponding to the target corrected first probability based on the target corrected first probability.

In some embodiments, the apparatus further includes the second determination module 402, the third determination module 403, and the fourth determination module 404.

The second determination module 402 is further configured to determine, when the first correlation probability is greater than the preset probability threshold, the second correlation probability between the body to be correlated and the wrist key point in the key points.

The third determination module 403 is further configured to determine, when the second correlation probability is greater than the preset probability threshold, the third correlation probability.

The fourth determination module 404 is further configured to determine, when the third correlation probability is greater than the preset probability threshold, the correlation degree between the body to be correlated and the hand to be correlated based on the first correlation probability, the second correlation probability, and the third correlation probability.

In some embodiments, the apparatus further includes a first fusion module and a first updating module.

The first fusion module is configured to fuse the first correlation probability, the second correlation probability, and the third correlation probability to obtain a fused probability.

The first updating module is configured to update, when the fused probability is less than a third preset probability threshold, a position of the wrist key point corresponding to the second correlation probability to obtain an updated wrist key point.

In some embodiments, the apparatus further includes a first detection module.

The first detection module is configured to perform body detection, hand detection, and human key point detection on the image to be detected to determine the body detection box of the body to be correlated, the hand detection box of the hand to be correlated, and the key points of the body to be correlated.

It is to be noted that the above descriptions about the apparatus embodiment are similar to descriptions about the method embodiments and beneficial effects similar to those of the method embodiment are achieved. Technical details undisclosed in the apparatus embodiments of the disclosure may be understood with reference to the descriptions about the method embodiments of the disclosure.

It is to be noted that, in the embodiments of the disclosure, when implemented in form of a software function module and sold or used as an independent product, the body and hand correlation method may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a terminal, a server, etc.) to execute all or part of the method in each embodiment of the disclosure. The storage medium includes various media capable of storing program codes such as a U disk, a mobile hard disk, a Read Only Memory (ROM), a magnetic disk or an optical disk. Therefore, the embodiments of the disclosure are not limited to any specific hardware and software combination.

The embodiments of the disclosure provide a computer program product, which includes a computer-executable instruction. The computer-executable instruction is executed to implement the operations in the body and hand correlation method provided in the embodiments of the disclosure.

The embodiments of the disclosure also provide a computer storage medium, in which a computer-executable instruction is stored. The computer-executable instruction is executed by a processor to implement the body and hand correlation method provided in the abovementioned embodiments.

The embodiments of the disclosure provide a computer program, which includes a computer-executable instruction. The computer-executable instruction is executed by a computer to implement the operations in the body and hand correlation method provided in the embodiments of the disclosure.

Figure 5:
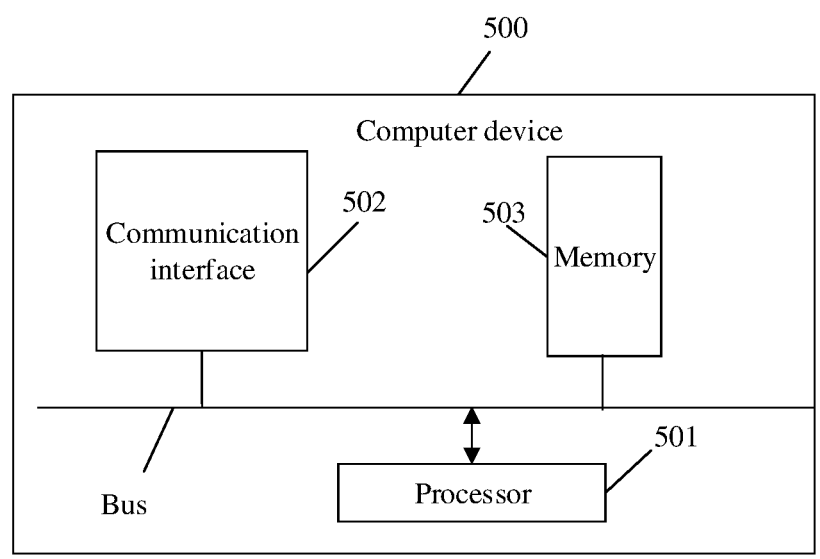
FIG. 5 is a composition structure diagram of a computer device according to an embodiment of the disclosure.

The embodiments of the disclosure provide a computer device. FIG. 5 is a composition structure diagram of a computer device according to an embodiment of the disclosure. As illustrated in FIG. 5, the computer device 500 includes a processor 501, at least one communication bus, a communication interface 502, at least one external communication interface, and a memory 503. The communication interface 502 is configured to implement connection communications between these components. The communication interface 502 may include a display screen, and the external communication interface may include a standard wired interface and wireless interface. The processor 501 is configured to execute an image processing program in the memory to implement the body and hand correlation method provided in the abovementioned embodiments.

The above descriptions about the embodiments of the body and hand correlation apparatus, the computer device, and the storage medium are similar to the descriptions about the method embodiments, and technical descriptions and beneficial effects are similar to those of the corresponding method embodiments. Due to the space limitation, references can be made to the records in the method embodiments, and elaborations are omitted herein. Technical details undisclosed in the embodiments of the body and hand correlation apparatus, computer device and storage medium of the disclosure may be understood with reference to the descriptions about the method embodiments of the disclosure.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" mentioned throughout the specification does not always refer to the same embodiment. In addition, these specific features, structures or characteristics may be combined in any appropriate manner in one or more embodiments. It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority and inferiority of the embodiments but only for description. It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

In some embodiments provided by the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each function unit in each embodiment of the disclosure may be integrated into a processing unit, each unit may also serve as an independent unit and two or more than two units may also be integrated into a unit. The integrated unit may be implemented in a hardware form and may also be implemented in form of hardware and software function unit. Those of ordinary skill in the art should know that all or part of the operations of the method embodiment may be implemented by related hardware instructed through a program, the program may be stored in a computer-readable storage medium, and the program is executed to execute the operations of the method embodiment. The storage medium includes: various media capable of storing program codes such as a mobile storage device, a ROM, a magnetic disk, or an optical disc.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes such as a mobile hard disk, a ROM, a magnetic disk, or an optical disc. The above is only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A body and hand correlation method, comprising:
   in an image to be detected of which an image content comprises a body to be correlated and a hand to be correlated, determining a first correlation probability between a body detection box of the body to be correlated and a hand detection box of the hand to be correlated;
   determining, based on key points in the body detection box, a second correlation probability between the body to be correlated and a wrist key point in the key points, wherein the key points in the body detection box comprise the wrist key point and an elbow key point belonging to the same arm;
   determining a third correlation probability between the hand detection box and the wrist key point based on the wrist key point and elbow key point belonging to the same arm; and
   determining a correlation degree between the body to be correlated and the hand to be correlated based on the first correlation probability, the second correlation probability and the third correlation probability.

2. The method of claim 1, wherein determining the first correlation probability between the body detection box of the body to be correlated and the hand detection box of the hand to be correlated in the image to be detected of which the image content comprises the body to be correlated and the hand to be correlated comprises:
   determining a body feature in the body detection box and a hand feature in the hand detection box; and
   determining the first correlation probability between the body detection box and the hand detection box based on the body feature and the hand feature.

3. The method of claim 1, wherein determining, based on the key points in the body detection box, the second correlation probability between the body to be correlated and the wrist key point in the key points comprises:
   determining a confidence that the wrist key point is a truth point; and
   determining a correlation probability between the body to be correlated and the wrist key point based on the confidence to obtain the second correlation probability.

4. The method of claim 1, wherein determining the third correlation probability between the hand detection box and the wrist key point based on the wrist key point and elbow key point belonging to the same arm comprises:
   determining a positional relationship between the wrist key point and the hand detection box based on the wrist key point and elbow key point belonging to the same arm; and
   determining the third correlation probability based on the positional relationship and a confidence corresponding to the wrist key point, the confidence corresponding to the wrist key point comprising the confidence that the wrist key point is a truth point.

5. The method of claim 4, wherein determining the positional relationship between the wrist key point and the hand detection box based on the wrist key point and elbow key point belonging to the same arm comprises:
   determining a first connecting line connecting the wrist key point and elbow key point belonging to the same arm;
   determining a second connecting line connecting the wrist key point and a preset point in the hand detection box; and
   determining an included angle between the first connecting line and the second connecting line by taking the wrist key point as a vertex along a forearm direction of the arm to obtain the positional relationship.

6. The method of claim 1, wherein determining the correlation degree between the body to be correlated and the hand to be correlated based on the first correlation probability, the second correlation probability and the third correlation probability comprises:
correcting the first correlation probability based on the second correlation probability and the third correlation probability to obtain a corrected first probability; and
determining the correlation degree between the body to be correlated and the hand to be correlated based on the corrected first probability.

7. The method of claim 6, wherein, when the image content of the image to be detected comprises multiple bodies to be correlated and multiple hands to be correlated, determining the correlation degree between the body to be correlated and the hand to be correlated based on the corrected first probability comprises:
determining a corrected first probability between each body to be correlated and each hand to be correlated to obtain a corrected first probability set;
screening a target corrected first probability with a probability value greater than a preset probability threshold from the corrected first probability set; and
determining, based on the target corrected first probability, the hand to be correlated matched with the body to be correlated corresponding to the target corrected first probability.

8. The method of claim 1, wherein determining the second correlation probability between the body to be correlated and the wrist key point in the key points comprises:
when the first correlation probability is greater than a preset probability threshold, determining the second correlation probability between the body to be correlated and the wrist key point in the key points;
determining the third correlation probability between the hand detection box and the wrist key point comprises:
when the second correlation probability is greater than the preset probability threshold, determining the third correlation probability; and
determining the correlation degree between the body to be correlated and the hand to be correlated based on the first correlation probability, the second correlation probability and the third correlation probability comprises:
when the third correlation probability is greater than the preset probability threshold, determining the correlation degree between the body to be correlated and the hand to be correlated based on the first correlation probability, the second correlation probability and the third correlation probability.

9. The method of claim 7, further comprising: before determining the correlation degree between the body to be correlated and the hand to be correlated based on the first correlation probability, the second correlation probability and the third correlation probability,
fusing the first correlation probability, the second correlation probability and the third correlation probability to obtain a fused probability; and
when the fused probability is less than a third preset probability threshold, updating a position of the wrist key point corresponding to the second correlation probability to obtain an updated wrist key point.

10. The method of claim 1, further comprising: before determining the first correlation probability between the body detection box of the body to be correlated and the hand detection box of the hand to be correlated,
performing body detection, hand detection, and human key point detection on the image to be detected to determine the body detection box of the body to be correlated, the hand detection box of the hand to be correlated, and the key points of the body to be correlated.

11. A body and hand correlation apparatus, comprising:
a processor;
a memory for storing an instruction executable by the processor; and
a plurality of program modules that, when executed by the processor, cause the body and hand correlation apparatus to perform predefined functions, the plurality of program modules further comprising:
a first determination module, configured to determine, in an image to be detected of which an image content comprises a body to be correlated and a hand to be correlated, a first correlation probability between a body detection box of the body to be correlated and a hand detection box of the hand to be correlated;
a second determination module, configured to determine, based on key points in the body detection box, a second correlation probability between the body to be correlated and a wrist key point in the key points, wherein the key points in the body detection box comprise the wrist key point and an elbow key point belonging to the same arm;
a third determination module, configured to determine a third correlation probability between the hand detection box and the wrist key point based on the wrist key point and elbow key point belonging to the same arm; and
a fourth determination module, configured to determine a correlation degree between the body to be correlated and the hand to be correlated based on the first correlation probability, the second correlation probability and the third correlation probability.

12. The apparatus of claim 11, wherein the first determination module comprises:
a first determination submodule, configured to determine a body feature in the body detection box and a hand feature in the hand detection box; and
a second determination submodule, configured to determine the first correlation probability between the body detection box and the hand detection box based on the body feature and the hand feature.

13. The apparatus of claim 11, wherein the second determination module comprises:
a third determination submodule, configured to determine a confidence that the wrist key point is a truth point; and
a fourth determination submodule, configured to determine a correlation probability between the body to be correlated and the wrist key point based on the confidence to obtain the second correlation probability.

14. The apparatus of claim 11, wherein the third determination module comprises:
a fifth determination submodule, configured to determine a positional relationship between the wrist key point and the hand detection box based on the wrist key point and elbow key point belonging to the same arm; and
a sixth determination submodule, configured to determine the third correlation probability based on the positional relationship and a confidence corresponding to the wrist key point, the confidence corresponding to the wrist key point comprising the confidence that the wrist key point is a truth point.

15. The apparatus of claim 14, wherein the fifth determination submodule comprises:
- a first connecting unit, configured to determine a first connecting line connecting the wrist key point and elbow key point belonging to the same arm;
- a second connecting unit, configured to determine a second connecting line connecting the wrist key point and a preset point in the hand detection box; and
- a first determination unit, configured to determine an included angle between the first connecting line and the second connecting line by taking the wrist key point as a vertex along a forearm direction of the arm to obtain the positional relationship.

16. The apparatus of claim 14, wherein the fourth determination module comprises:
- a first correction submodule, configured to correct the first correlation probability based on the second correlation probability and the third correlation probability to obtain a corrected first probability; and
- a seventh determination submodule, configured to determine the correlation degree between the body to be correlated and the hand to be correlated based on the corrected first probability.

17. The apparatus of claim 16, wherein when the image content of the image to be detected includes multiple bodies to be correlated and multiple hands to be correlated, the seventh determination submodule comprises:
- a fourth determination unit, configured to determine a corrected first probability between each body to be correlated and each hand to be correlated to obtain a corrected first probability set;
- a first screening unit, configured to screen a target corrected first probability with a probability value greater than a preset probability threshold from the corrected first probability set; and
- a fifth determination unit, configured to determine the hand to be correlated that is matched with the body to be correlated corresponding to the target corrected first probability based on the target corrected first probability.

18. The apparatus of claim 11, wherein
the second determination module is further configured to determine, when the first correlation probability is greater than a preset probability threshold, the second correlation probability between the body to be correlated and the wrist key point in the key points;
the third determination module is further configured to determine, when the second correlation probability is greater than the preset probability threshold, the third correlation probability; and
the fourth determination module is further configured to determine, when the third correlation probability is greater than the preset probability threshold, the correlation degree between the body to be correlated and the hand to be correlated based on the first correlation probability, the second correlation probability, and the third correlation probability.

19. The apparatus of claim 17, wherein the plurality of program modules further comprise:
- a first fusion module, configured to fuse the first correlation probability, the second correlation probability, and the third correlation probability to obtain a fused probability; and
- a first updating module, configured to, when the fused probability is less than a third preset probability threshold, update a position of the wrist key point corresponding to the second correlation probability to obtain an updated wrist key point.

20. A non-transitory computer storage medium, having a computer-executable instruction stored thereon, the computer-executable instruction being executed to implement a body and hand correlation method, the method comprising:
- in an image to be detected of which an image content comprises a body to be correlated and a hand to be correlated, determining a first correlation probability between a body detection box of the body to be correlated and a hand detection box of the hand to be correlated;
- determining, based on key points in the body detection box, a second correlation probability between the body to be correlated and a wrist key point in the key points, wherein the key points in the body detection box comprise the wrist key point and an elbow key point belonging to the same arm;
- determining a third correlation probability between the hand detection box and the wrist key point based on the wrist key point and elbow key point belonging to the same arm; and
- determining a correlation degree between the body to be correlated and the hand to be correlated based on the first correlation probability, the second correlation probability and the third correlation probability.

* * * * *